(12) United States Patent
Mozeika et al.

(10) Patent No.: US 10,486,311 B2
(45) Date of Patent: Nov. 26, 2019

(54) ROBOTIC GRIPPER CAMERA

(71) Applicant: iRobot Defense Holdings, Inc., Chelmsford, MA (US)

(72) Inventors: Annan Michael Mozeika, Groton, MA (US); Timothy R. Ohm, Grover Beach, CA (US); Christopher Thomas Brown, Lowell, MA (US)

(73) Assignee: Flir Detection, Inc., Wilsonville, OR (US)

( * ) Notice: Subject to any disclaimer, the term of this patent is extended or adjusted under 35 U.S.C. 154(b) by 0 days.

(21) Appl. No.: 15/900,307

(22) Filed: Feb. 20, 2018

(65) Prior Publication Data

US 2018/0236666 A1    Aug. 23, 2018

Related U.S. Application Data

(60) Provisional application No. 62/461,089, filed on Feb. 20, 2017.

(51) Int. Cl.
*B25J 5/00*         (2006.01)
*B25J 9/16*         (2006.01)
(Continued)

(52) U.S. Cl.
CPC ............ *B25J 9/1697* (2013.01); *B25J 5/005* (2013.01); *B25J 9/161* (2013.01); *B25J 9/162* (2013.01); *B25J 9/1612* (2013.01); *B25J 9/1689* (2013.01); *B25J 13/006* (2013.01); *B25J 13/065* (2013.01); *B25J 15/0009* (2013.01); *B25J 15/0213* (2013.01); *B25J 19/023* (2013.01); *Y10S 901/01* (2013.01); *Y10S 901/02* (2013.01); *Y10S 901/31* (2013.01); *Y10S 901/47* (2013.01)

(58) Field of Classification Search
CPC ............................... B25J 9/1697; B25J 5/005
USPC ..................................................... 318/568.12
See application file for complete search history.

(56) References Cited

U.S. PATENT DOCUMENTS 6,113,343 A     9/2000   Goldenberg et al.
7,843,431 B2   11/2010   Robbins et al.
(Continued)

FOREIGN PATENT DOCUMENTS

KR   10-1999-0052635 A   7/1999
WO   WO-2018027219 A1    2/2018
WO   WO 2018/152504      8/2018

OTHER PUBLICATIONS

Notification of Transmittal of the International Search Report and the Written Opinion of the International Searching Authority, or the Declaration for International Application No. PCT/US2018/018734 (dated May 29, 2018).

*Primary Examiner* — Erick D Glass
(74) *Attorney, Agent, or Firm* — Jenkins, Wilson, Taylor & Hunt P.A.

(57) ABSTRACT

An unmanned ground vehicle includes a main body, a drive system supported by the main body, and a manipulator arm pivotally coupled to the main body. The drive system comprising right and left driven track assemblies mounted on right and left sides of the main body. The manipulator arm includes a gripper, a wrist motor configured for rotating the gripper, and an inline camera in a palm of the gripper. The inline camera is mechanically configured to remain stationary with respect to the manipulator arm while the wrist motor rotates the gripper.

19 Claims, 9 Drawing Sheets

(51) Int. Cl.
*B25J 13/06* (2006.01)
*B25J 15/00* (2006.01)
*B25J 15/02* (2006.01)
*B25J 13/00* (2006.01)
*B25J 19/02* (2006.01)

(56) References Cited

U.S. PATENT DOCUMENTS

| | | | |
|---|---|---|---|
| 2008/0286241 A1* | 11/2008 | Lee | A61L 27/3804 |
| | | | 424/93.7 |
| 2009/0037033 A1 | 2/2009 | Phillips et al. | |
| 2010/0100256 A1 | 4/2010 | Jurmain et al. | |
| 2010/0164243 A1 | 7/2010 | Albin | |
| 2011/0106339 A1* | 5/2011 | Phillips | G05D 1/0033 |
| | | | 701/2 |
| 2011/0231014 A1 | 9/2011 | Krajewski et al. | |
| 2012/0286533 A1 | 11/2012 | Mettler et al. | |
| 2013/0054029 A1 | 2/2013 | Huang et al. | |
| 2013/0268118 A1 | 10/2013 | Grinstead et al. | |
| 2013/0325182 A1* | 12/2013 | Setrakian | B25J 9/161 |
| | | | 700/264 |
| 2014/0110183 A1 | 4/2014 | Rudakevych et al. | |
| 2015/0190925 A1* | 7/2015 | Hoffman | B25J 9/161 |
| | | | 700/257 |
| 2016/0243698 A1 | 8/2016 | Hoffman et al. | |
| 2018/0093723 A1 | 4/2018 | Ohm et al. | |

* cited by examiner

ROBOTIC GRIPPER CAMERA

PRIORITY CLAIM

This application claims the benefit of U.S. Provisional Patent Application Ser. No. 62/461,089 filed Feb. 20, 2017, the disclosure of which is incorporated herein by reference in its entirety.

BACKGROUND

This specification relates generally to mobile robots and manipulator arms for mobile robots.

Operators of various types of mobile robots have a need to rapidly and reliably grasp objects with a manipulator, e.g., a manipulator employed on an unmanned ground robot. Some conventional mobile robots include an offset camera, which is offset from a manipulator end-effector, to provide a video feed to an operator control unit. It can be difficult at times for the operator to center the manipulator end-effector on an object prior to grasping when only an offset camera is available for situational awareness.

SUMMARY

An unmanned ground vehicle includes a main body, a drive system supported by the main body, and a manipulator arm pivotally coupled to the main body. The drive system comprising right and left driven track assemblies mounted on right and left sides of the main body. The manipulator arm includes a gripper, a wrist motor configured for rotating the gripper, and an inline camera in a palm of the gripper. The inline camera is mechanically configured to remain stationary with respect to the manipulator arm while the wrist motor rotates the gripper.

DETAILED DESCRIPTION

Figure 1:
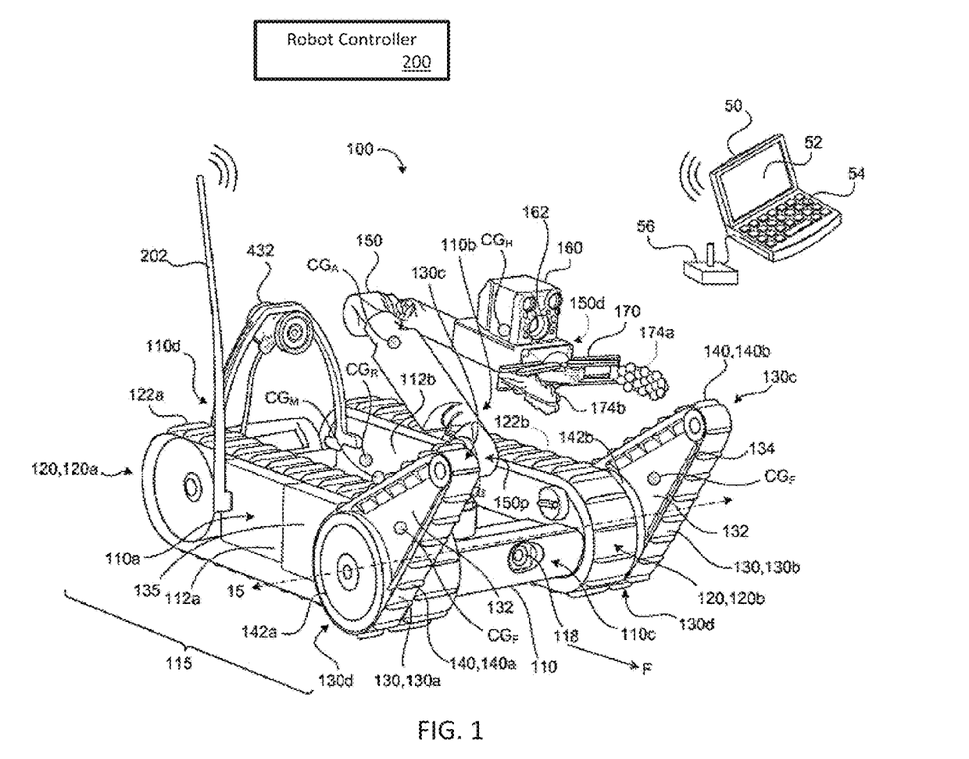
FIG. 1 illustrates an example mobile robotic vehicle.

FIG. 1 illustrates an example mobile robotic vehicle 100 that may be used as an unmanned ground vehicle capable of conducting operations in various environments such as urban terrain, tunnels, sewers, and caves. Moreover, the robot 100 may aid in the performance of urban Intelligence, Surveillance, and Reconnaissance (ISR) missions, chemical/Toxic Industrial Chemicals (TIC), Toxic Industrial Materials (TIM), and reconnaissance. Although the robot 100 shown includes a track driven drive system having flippers, other mobility platforms, configurations and morphologies are possible as well, such as wheel driven platforms, crawling or walking platforms, and so on.

The robot 100 can be designed to move about in a variety of environments, including an urban environment of buildings (including staircases), streets, underground tunnels, building ruble, and in vegetation, such as through grass and around trees. The robot 100 may have a variety of features which provide robust operation in these environments, including impact resistance, tolerance of debris entrainment, and invertible operability.

The robot 100 includes a main body 110 (or chassis) having a drive system 115 supported by the main body 110. The main body 110 has right and left sides 110a, 110b as well as a leading end 110c, a trailing end 110d and a center of gravity $CG_M$. In the example shown, the main body 110 includes right and left rigid side plates 112a, 112b disposed parallel to each other. At least one transverse support 114 rigidly couples the right side place 112a to the left side plate 112b. The rigid components are designed for strength and low weight and can be made from a material such as 7075-T6 aluminum. Alternative versions of the robot 100 can use other materials, such as other lightweight metals, polymers, or composite materials. The robot 100 may be electrically powered (e.g. by a bank of standard military BB-2590 replaceable and rechargeable lithium-ion batteries).

In some implementations, the drive system 115 includes right and left driven track assemblies 120a, 120b (also referred to as the main tracks 120) mounted on the corresponding right and left sides 110a, 110b of the main body 110 and having right and left driven tracks 122a, 122b respectively. Each driven track 122a, 122b is trained about a corresponding front wheel, which rotates about a drive axis 15. Although the robot 100 is depicted as having skid steer driven tracks, other drive systems are possible as well, such as differentially driven wheels, articulated legs, and the like.

The robot 100 includes at least one extendable flipper 130 mounted on the main body 110. In some examples, the robot 100 is configured to releasably receive one or more flippers 130 onto the main body 110 (e.g., onto and concentric with one of the front drive wheels at the leading end 110 c of the main body 110). As shown in FIG. 1, the robot 100 includes right and left flippers 130a, 130b, which are shown in an extended configuration extending beyond the front or leading end 110c of the main body 110.

The flippers 130, 130a, 130b each have a distal end 130c, a pivot end 130d, and a flipper center of gravity $CG_F$ between the distal and pivot ends 130c, 130d. Each flipper 130, 130a, 130b pivots about the drive axis 15 near the leading end 110c of the main body 110. Moreover, each flipper 130, 130a, 130b may have a driven flipper track 140, 140a, 140b trained about flipper drive wheel 142a, 142b, which is driven about the drive axis 15 at the pivot end 130d of the flipper 130a, 130b.

In the example shown, flipper track supports 134 disposed on a flipper side plate 132 of the flipper 130 support the corresponding flipper track 140. In some implementations, the flippers 130, 130a, 130b can be rotated in unison in a continuous 360 degrees between a stowed position, in which the flippers 130 a, 130b are next to the right and left side plates 112a, 112b of the main body 110, and at least one deployed position, in which the flippers 130a, 130b are pivoted at an angle with respect to the main tracks 122a, 122b. The center of gravity $CG_R$ of the robot 100 can be contained within an envelope of the 360 degree rotation of the flippers 130a, 130b.

In some implementations, the flipper side plates 132 of the respective right and left flippers 130a, 130b are rigidly coupled to one another through the articulator shaft to move together in unison. In other implementations, the flippers 130a, 130b pivot independently of each other. The combination of main tracks assemblies 120a, 120b and flippers 130, 130a, 130b provide an extendable drive base length to negotiate gaps in a supporting surface. In some examples, the right main tack 122a and the right flipper track 140a are driven in unison and the left main tack 122b and the left flipper track 140b are driven in unison to provide a skid steer drive system.

The main body 110 may include one or more cameras 118 disposed near the leading end 110c of the main body 110 and may be positioned to have a field of view directed forward and/or upward. The camera(s) 118 may capture images and/or video of the robot environment for navigating the robot 100 and/or performing specialized tasks, such as maneuvering through tunnels, sewers, and caves, etc.

The robot 100 may include one or more robotic manipulator arms 150 (e.g., articulated arms) each having a pivot end 150p pivotally coupled to the main body 110 and a distal end 150d that may be configured to receive a head 160 or a gripper 170 or both. The arm 150 may be coupled to the main body 110 in a manner that allows the arm 150 to be stowed along the main body 110 in a compact configuration and pivot away from main body 110 to allow a wider range of CG-shifting, for example, to negotiate obstacles.

As shown in FIG. 1, a head 160 and a gripper 170 are mounted on the distal end 150d of the arm 150. The arm 150 has an arm center of gravity $CG_A$ and the head 160 has a center of gravity $CG_H$. The head 160 may include a camera 162 (e.g., visible light and/or infrared camera), radar, LIDAR (Light Detection And Ranging, which can entail optical remote sensing that measures properties of scattered light to find range and/or other information of a distant target), LADAR (Laser Detection and Ranging), a communication device (radio frequency, wireless, etc.), and/or other components.

To achieve reliable and robust autonomous or semi-autonomous movement, the robot 100 may include a sensor system having several different types of sensors. The sensors can be used in conjunction with one another to create a perception of the robot's environment (i.e., a local sensory perception) sufficient to allow a control system for the robot 100 to determine actions to take in that environment. The sensor system 400 may include one or more types of sensors supported by the robot body 110, which may include obstacle detection obstacle avoidance (ODOA) sensors, communication sensors, navigation sensors, and so on.

For example, these sensors may include proximity sensors, contact sensors, cameras (e.g., volumetric point cloud imaging, three-dimensional (3D) imaging or depth map sensors, visible light camera and/or infrared camera), sonar (e.g., ranging sonar and/or imaging sonar), radar, LIDAR (Light Detection And Ranging, which can entail optical remote sensing that measures properties of scattered light to find range and/or other information of a distant target), LADAR (Laser Detection and Ranging), laser scanner, ultrasound sensor, and so on.

In some implementations, the robot 100 includes a robot controller 200 in communication with the drive system 115, the arm 150, and any head(s) 160 or gripper(s) 170 mounted on the arm 150. The robot controller 200 may issue drive commands to one or more motors driving the main tracks 120 and the flipper tracks 140. Moreover, the robot controller 200 may issue rotational commands to a flipper motor 135 to rotate the flippers 130 about the drive axis 15. The robot controller 200 may include one or more computer processors and associated memory systems.

The robot controller 200 may be implemented in hardware, software, firmware, or combinations of hardware, software and/or firmware. In some examples, the robot controller 200 may be implemented using a non-transitory computer readable medium storing computer executable instructions that when executed by one or more processors of a computer cause the computer to perform operations. Computer readable media may include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the robot controller 200 may be located on a single device or computing platform or may be distributed across multiple devices or computing platforms.

The proximity sensors may be converging infrared (IR) emitter-sensor elements, sonar sensors, ultrasonic sensors, and/or imaging sensors (e.g., 3D depth map image sensors) that provide a signal to a robot controller 200 when an object is within a given range of the robot 100. The robot controller 200 (executing a control system) may execute behaviors that cause the robot 100 to take an action, such as changing its direction of travel, when an obstacle is detected.

In some examples, the sensor system includes an inertial measurement unit (IMU) in communication with the robot controller 200 to measure and monitor a moment of inertia of the robot 100 with respect to the overall center of gravity CGR of the robot 100. The robot controller 200 may monitor any deviation in feedback from the IMU from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

When accelerating from a stop, the robot controller 200 may take into account a moment of inertia of the robot 100 from its overall center of gravity CGR to prevent robot tipping. The robot controller 200 may use a model of its pose, including its current moment of inertia. When payloads are supported, the robot controller 200 may measure a load impact on the overall center of gravity CGR and monitor movement of the robot moment of inertia. If this is not possible, the robot controller 200 may apply a test torque command to the drive system 115 and measure actual linear and angular acceleration of the robot using the IMU, in order to experimentally determine safe limits.

The robot controller 200 may include a communication system 202, which includes, for example, a radio to communicate with the remote operator control unit (OCU) 50 to receive commands and issue status and/or navigation information. The OCU 50 may include a display 52 (e.g., LCD or touch screen), a keyboard 54, and one or more auxiliary user inputs 56, such as a joystick or gaming unit. The OCU 50 may also include a computing processor and memory in communication. The processor is programmed for rendering graphics on the display 52. The OCU 50 allows an operator or user to control the robot 100 from a distance.

In some examples, the user can select different levels of human control over the robot 100, ranging from a teleoperation mode, in which the user directly controls the motors and actuators on the robot 100, to autonomous operation, in which the user passes higher-level commands to the robot 100. In partially autonomous operation, the robot 100 can perform tasks such as following a perimeter or wall, recovering from getting stuck in an opening or due to high centering on an obstruction, evading a moving object, or seeking light.

The robot controller 200 can be mounted in any appropriate location on the robot 100. In some implementations, the robot controller 200 is mounted on the main body 110 in a location spanning between the drive tracks or wheels. Alternatively, the robot controller 200 can be located in another location to open more space for the arm 150.

Figure 2:
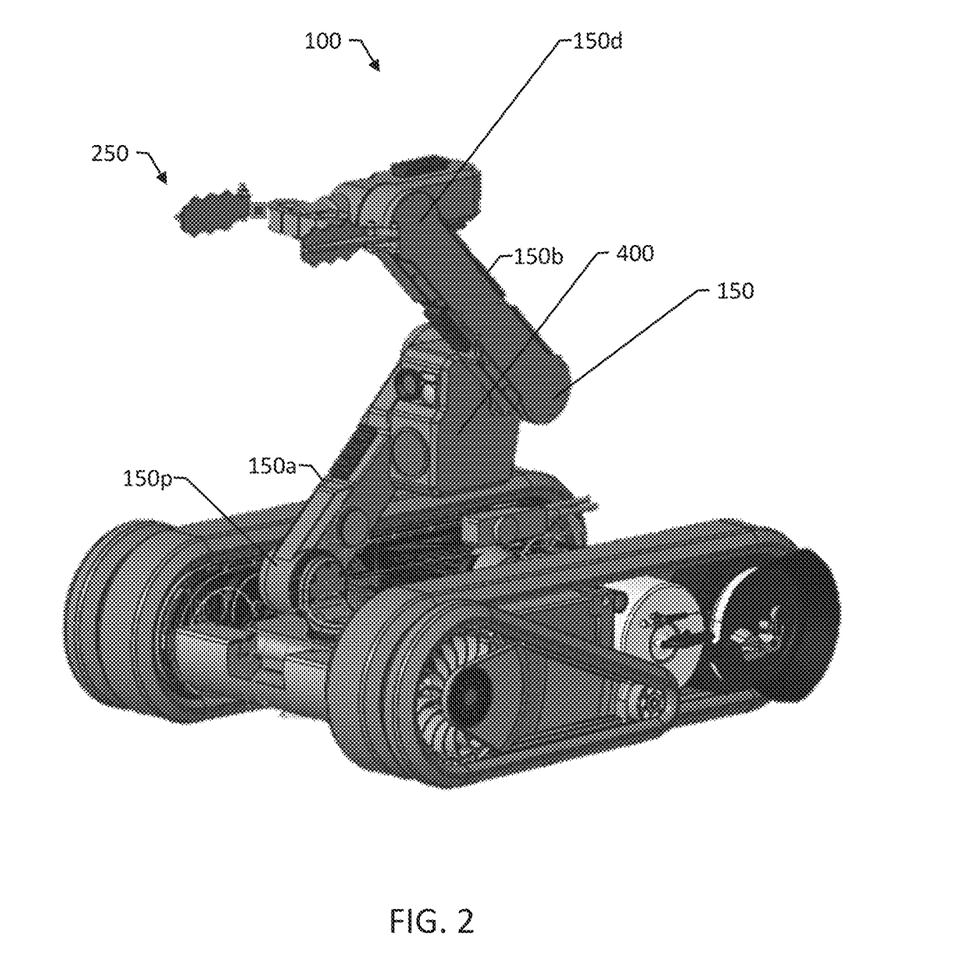
FIG. 2 illustrates the example robot in a morphology with the manipulator in an extended position.

FIG. 2 illustrates the example robot 100 in a morphology with the manipulator 150 in an extended position. The robot 100 as illustrated includes an optional sensor suite 400, e.g., an Intelligence, Surveillance, and Reconnaissance (ISR) sensor suite. The example manipulator 150 has a pivot end 150p pivotally coupled to the main body 110 and a distal end 150d that receives a gripper 250. The manipulator 150 includes a first extension 150a extending away from the pivot end 150p and a second extension 150b extending away from the end of the first extension 150a. The second extension 150b is pivotally coupled to the first extension 150a, e.g., by way of a bridge housing a motor for pivoting the second extension 150b. Various other types of manipulators can be used.

Figure 3A:
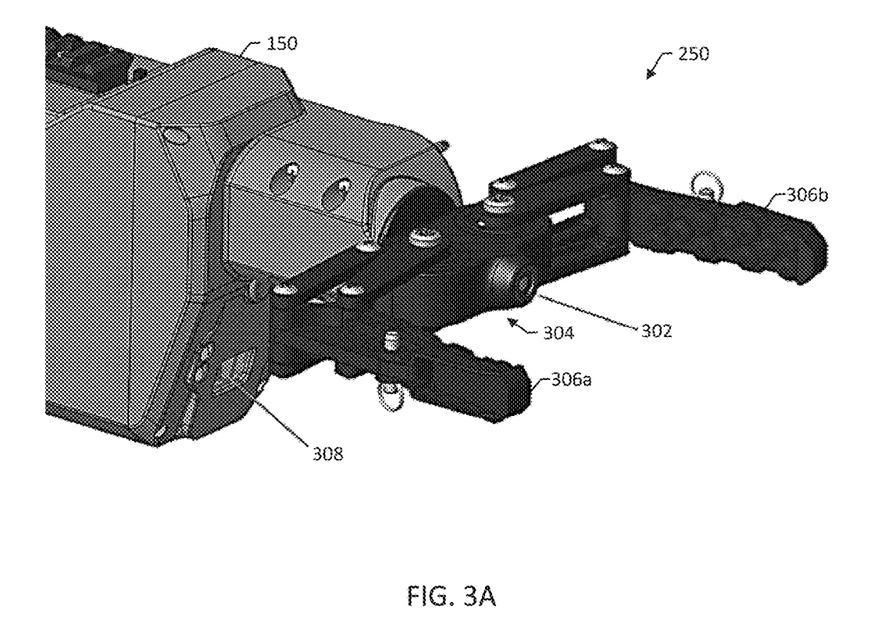
FIGS. 3A-E illustrate the gripper with an inline camera.

FIGS. 3A-E illustrate the gripper 250 with an inline camera 302. FIG. 3A is a perspective view showing the inline camera 302 in a palm 304 of the gripper 250. The gripper 250 includes a number of articulated gripper fingers 306a-b that surround the palm 304 of the gripper 250. The gripper 250 includes a gripping motor configured to cause the articulated gripper fingers 306a-b to contract from an open position to a closed position to grip and object. For example, the gripper can include a gripper closure rack and a number of pulleys coupling the articulated gripper fingers 304a-b to the gripper motor.

The gripper 250 also includes a wrist motor configured for rotating the gripper 250 about a gripper roll axis. The inline camera 302 can be centered within the palm 304 of the gripper 250. For example, the inline camera 302 can be equidistant from the articulated gripper gingers 306a-b and centered on the gripper roll axis of the wrist motor. The gripper 250 can optionally include an offset gripper camera 308 on the manipulator arm 150 for providing an additional or alternative view of the gripper 250. In some examples, the gripper 250 includes more than one offset gripper camera.

The inline camera 302 is mechanically configured to remain stationary with respect to the manipulator arm 150 while the wrist motor rotates the gripper 250. For example, the gripper 250 can include a camera housing tube between the pulleys housing the inline camera 302. The camera housing tube can be coupled to the manipulator arm 150 independently of a gripper coupling to the manipulator arm by the wrist motor. Electrical cables can then extend through the camera housing tube for carrying power and communication signals for the inline camera 302.

It can be difficult at times for an operator to control the gripper 250 to contact an object prior to grasping when only an offset camera is available for situational awareness. Inline cameras that do not remain stationary when the wrist motor rotates the gripper can be disorienting. Since the example inline camera 302 is configured to remain stationary, the inline camera 302 may be useful to provide improved situational awareness during grasping and avoid operator disorientation that may be experience with non-stationary inline gripper cameras.

The inline camera 302 is mechanically configured to remain stationary. This can be useful in comparison to allowing an inline camera to rotate and creating a stationary image via video processing. For example, no electrical slip-rings are required to achieve continuous gripper rotation. Processing artifacts and lag due to video processing can be avoided. The image window need not be constrained be a round image window.

Figure 3B:
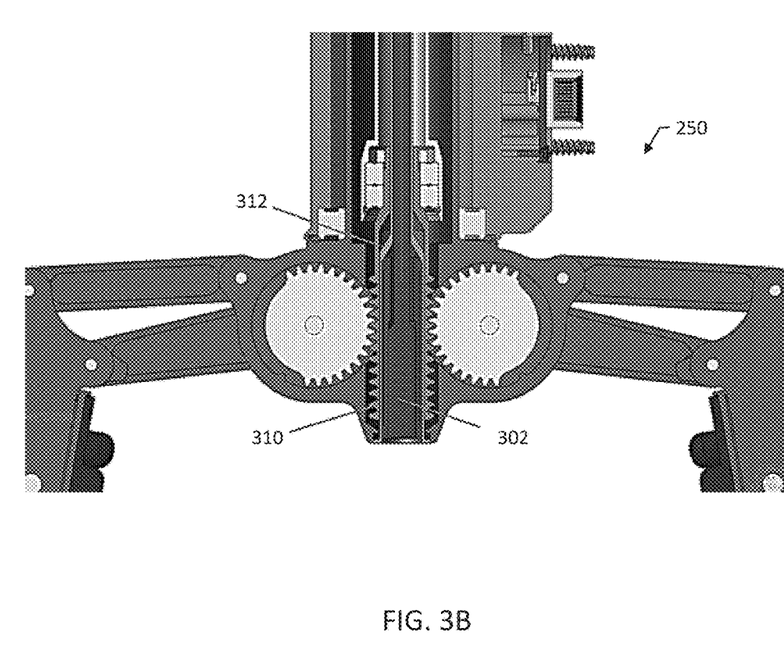
Figure 3C:
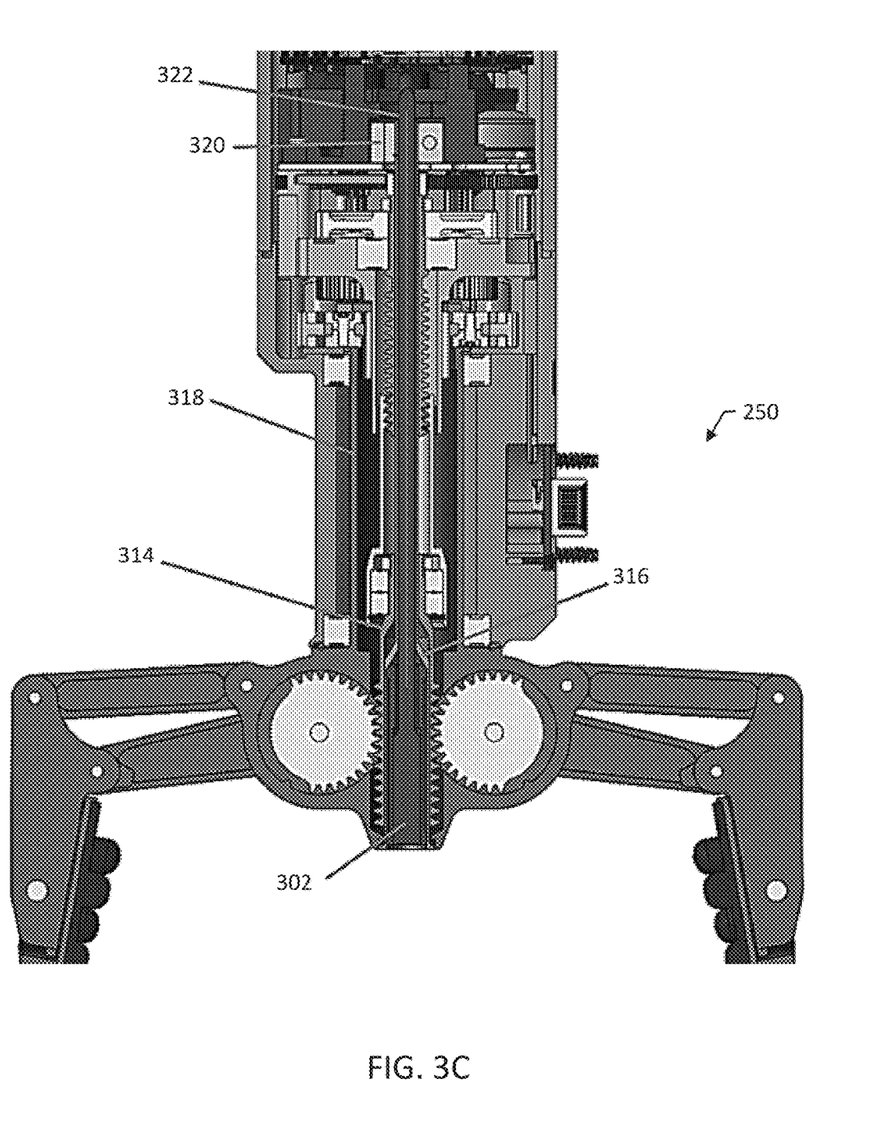

FIG. 3B is a top cross-sectional view of the gripper 250 showing an example gripper closure rack 310 and an example camera housing tube 312. FIG. 3C is a top cross-sectional view of the gripper 250 showing a an example closure rack 314, an example housing 316 for the inline camera 302, and an example wrist roll housing 318. FIG. 3C also shows an inline camera housing clamp 320 and an inline camera cable exit 322.

Figure 3D:
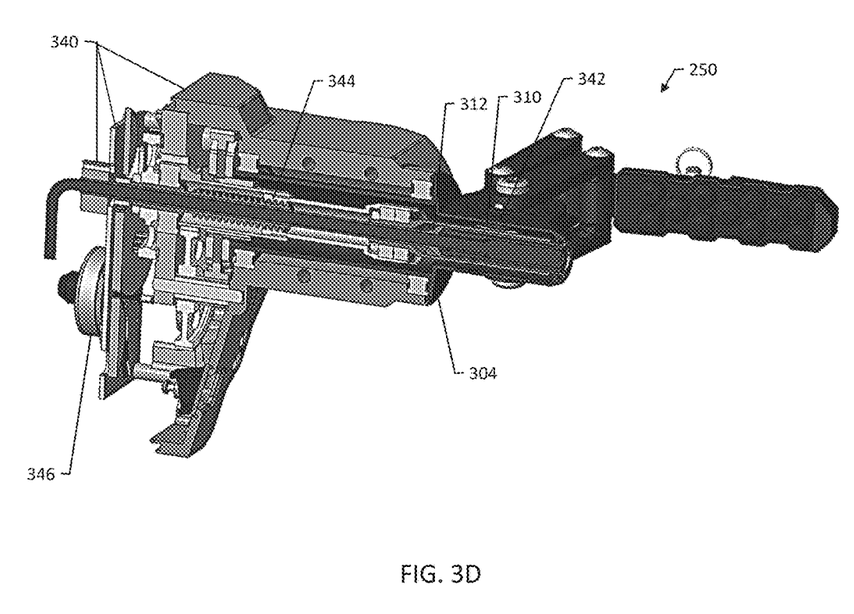
Figure 3E:
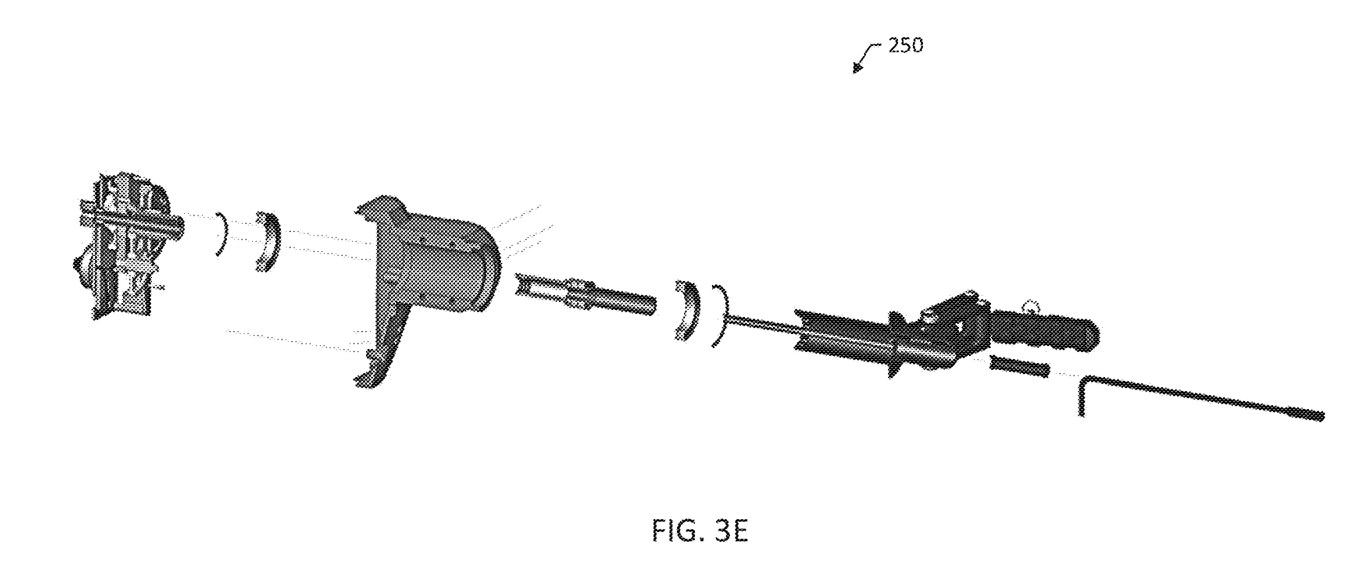

FIG. 3D is a cut-away from of the gripper 250. The camera 302 is mounted within a stationary sleeve 312 that is anchored to the gripper chassis 340. This camera 302 and sleeve 312 remain stationary with respect to the gripper chassis 340 regardless of the rotation of the gripper fingers. A rack 310, which can rotate with the gripper palm 304, transfers linear motion to the gripper finger pinions 342, that drive each finger open/close. The rack 310 is driven linearly by a lead screw 344, which is driven by an electric motor 346. FIG. 3E is an exploded view of the parts of the gripper 250.

Figure 4:
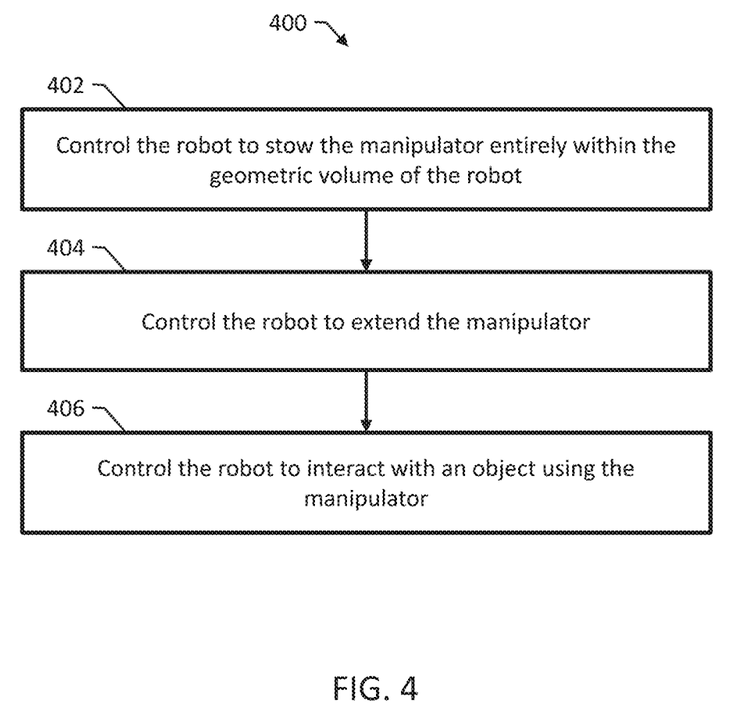
FIG. 4 is a flow chart of an example method for controlling the robot.

FIG. 4 is a flow chart of an example method 400 for controlling the robot 100. The method 400 can be performed by the robot controller 200. The robot controller 200 provides a video feed from an inline camera in a palm of a gripper on a manipulator arm to a remote operator control unit (402). The robot controller 200 controls a wrist motor to cause the wrist motor to rotate the gripper about a gripper roll axis, such that the inline camera remains stationary with respect to the manipulator arm while the wrist motor rotates the gripper (404). The robot controller 200 controls a gripper motor to cause the gripper to contract from an open position to a closed position to grip an object (406).

Figure 5:
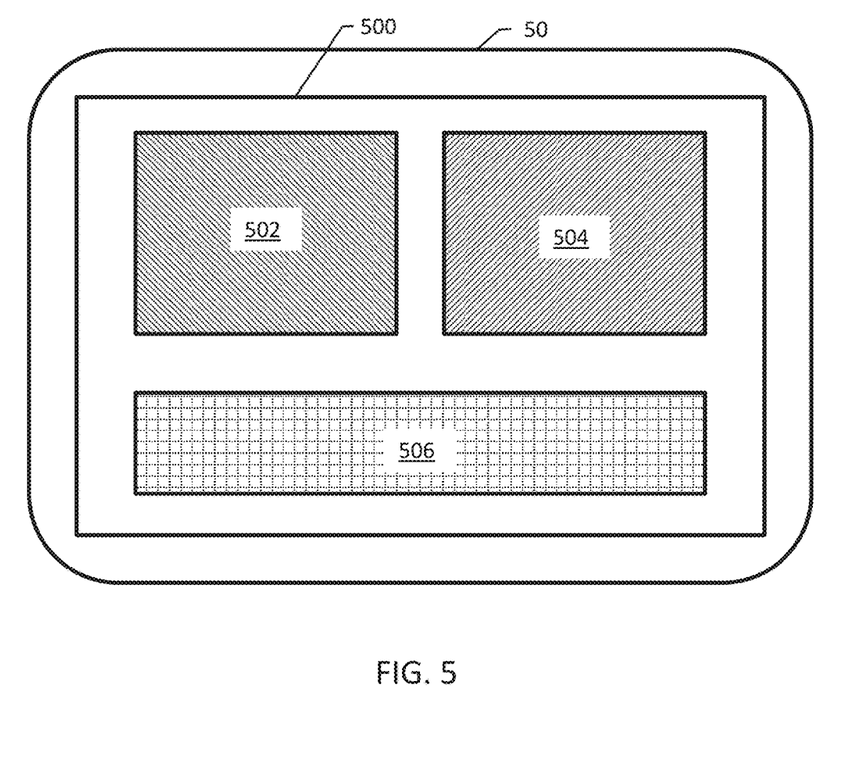
FIG. 5 illustrates an example graphical user interface (GUI) displayed on the OCU.

FIG. 5 illustrates an example graphical user interface (GUI) 500 displayed on the OCU 50, which is illustrated as a touchpad computer in this example. The GUI 500 includes a first window 502 displaying a first camera feed from the inline camera 302 of the gripper 250. The GUI 500 includes a second window 504 displaying a second camera feed from the offset gripper camera 308. The GUI 500 includes an area 506 for receiving operator input for controlling the gripper 250. In operation, the operator can cause the wrist motor to rotate the gripper, and because the inline camera 302 is configured to remain stationary with respect to the manipulator arm 150 while the wrist motor rotates the gripper, the orientation of the first camera feed in the first window 502 will remain unchanged even though the articulated gripper fingers may be seen rotating.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An unmanned ground vehicle comprising:
a main body;
a drive system supported by the main body, the drive system comprising right and left driven track assemblies mounted on right and left sides of the main body; and
a manipulator arm pivotally coupled to the main body, the manipulator arm comprising a gripper, a wrist motor configured for rotating the gripper, and an inline camera in a palm of the gripper, wherein the inline camera is mechanically configured to remain stationary with respect to the manipulator arm while the wrist motor rotates the gripper;
wherein the gripper comprises a plurality of articulated gripper fingers and a gripping motor configured to cause the articulated gripper fingers to move from an open position to a closed position to grip an object; and
wherein the inline camera is centered between the articulated gripper fingers, and wherein the inline camera is centered on a gripper roll axis of the wrist motor.

2. The unmanned ground vehicle of claim 1, wherein the inline camera is centered within the palm of the gripper.

3. The unmanned ground vehicle of claim 1, comprising a gripper closure rack and a plurality of pulleys coupling the articulated gripper fingers to the gripping motor.

4. The unmanned ground vehicle of claim 3, comprising a camera housing tube between the pulleys housing the inline camera, wherein the camera housing tube is coupled to the manipulator arm independently of a gripper coupling to the manipulator arm by the wrist motor.

5. The unmanned ground vehicle of claim 4, comprising one or more electrical cables extending though the camera housing tube to the inline camera for carrying power and communication signals for the inline camera.

6. The unmanned ground vehicle of claim 1, wherein the manipulator arm comprises a first section pivotally coupled to the main body at a pivot end and a second section pivotally coupled to the first section at an end opposite the pivot end.

7. The unmanned ground vehicle of claim 1, comprising a robot controller configured to control the drive system and the manipulator arm by supplying control signals to one or more drive system motors and one or more manipulator motors.

8. The unmanned ground vehicle of claim 1, comprising right and left flippers extending beyond a front end of the main body, wherein each of the right and left flippers pivots about a drive axis of the drive system, and wherein each of the right and left flippers comprises a driven flipper track trained about a flipper drive wheel which is driven about the drive axis.

9. The unmanned ground vehicle of claim 1, comprising a communication system configured to communicate with a remote operator control unit and to transmit a camera feed from the inline camera to the remote operator control unit.

10. The unmanned ground vehicle of claim 9, wherein the communication system is configured to receive one or more manipulator commands to extend or stow the manipulator arm.

11. The unmanned ground vehicle of claim 9, wherein the communication system is configured to receive one or more gripper commands to cause the gripper to contract or release.

12. The unmanned ground vehicle of claim 9, wherein the communication system is configured to receive one or more gripper commands to cause the wrist motor to rotate the gripper.

13. The unmanned ground vehicle of claim 1, comprising an offset gripper camera on the manipulator arm.

14. A system comprising:
an unmanned vehicle comprising:
a gripper and a wrist motor configured for rotating the gripper;
an inline camera in a palm of the gripper, wherein the inline camera is mechanically configured to remain stationary with respect to the unmanned vehicle while the wrist motor rotates the gripper, wherein the gripper comprises a plurality of articulated gripper fingers and a gripping motor configured to cause the articulated gripper fingers to move from an open position to a closed position to grip an object, and wherein the inline camera is centered between the articulated gripper fingers, and wherein the inline camera is centered on a gripper roll axis of the wrist motor; and
a vehicle communications system;
an operator control unit comprising:
a display screen and an operator input device;
a control unit communications system; and
at least one processor programmed for receiving, by the control unit communications system communicating with the vehicle communications system, a camera feed from the inline camera and displaying the camera feed on the display screen.

15. The system of claim 14, wherein the unmanned vehicle comprises a robot controller programmed for receiving, from the operator control unit and by the control unit communications system communicating with the vehicle communications system, one or more gripper commands to cause the gripper to contract or release and to cause the wrist motor to rotate the gripper.

16. The system of claim 15, wherein the unmanned vehicle comprises a manipulator arm and the gripper is coupled to the manipulator arm, and wherein the robot controller is programmed for receiving, from the operator control unit by the control unit communications system communicating with the vehicle communications system, one or more manipulator commands to stow or extend the manipulator arm.

17. The system of claim 16, wherein the unmanned vehicle comprises an offset gripper camera on the manipulator arm, and wherein the at least one processor of the operator control unit is programmed for displaying, at a same time, a first camera feed from the inline camera and a second camera feed from the offset gripper camera and for receiving, using the operator input device, operator input for controlling the gripper while displaying the first camera feed and the second camera feed at the same time and while the wrist motor rotates the gripper.

18. The system of claim 17, wherein the unmanned vehicle comprises a main body and a drive system supported by the main body, the drive system comprising right and left driven track assemblies mounted on right and left sides of the main body, and wherein the robot controller is programmed for receiving, from the operator control unit by the control unit communications system communicating with the vehicle communications system, one or more drive commands from driving the drive system.

19. A method for controlling an unmanned ground vehicle, the method comprising:
providing, by a robot controller, a video feed from an inline camera in a palm of a gripper on a manipulator arm to a remote operator control unit, wherein the gripper comprises a plurality of articulated gripper fingers and a gripping motor configured to cause the articulated gripper fingers to move from an open position to a closed position to drip an object, and wherein the inline camera is centered between the articulated gripper fingers, and wherein the inline camera is centered on a gripper roll axis of the wrist motor;
controlling, by the robot controller, a wrist motor to cause the wrist motor to rotate the gripper about a gripper roll axis, such that inline camera remains stationary with respect to the manipulator arm while the wrist motor rotates the gripper; and
controlling, by the robot controller, a gripper motor to cause the gripper to contract from an open position to a closed position to grip an object.

\* \* \* \* \*